United States Patent [19]

Chevallier

[11] 4,309,049
[45] Jan. 5, 1982

[54] RAPID DISCONNECT PIPE COUPLING DEVICE FOR CRYOGENIC SERVICE

[75] Inventor: Bernard Chevallier, Marsangy, France

[73] Assignee: FMC Corporation, San Jose, Calif.

[21] Appl. No.: 952,015

[22] Filed: Oct. 16, 1978

[30] Foreign Application Priority Data

Oct. 19, 1977 [FR] France ............................. 77 31514

[51] Int. Cl.³ ............................................. F16C 17/06
[52] U.S. Cl. ......................................... 285/18; 285/3; 285/365; 285/DIG. 5
[58] Field of Search ................... 285/18, DIG. 5, 365, 285/366, 367, 364, 407, 408, 409, 410, 411

[56] References Cited

U.S. PATENT DOCUMENTS

| | | | |
|---|---|---|---|
| 2,904,353 | 9/1959 | Brickhouse, Jr. | 285/421 X |
| 3,214,202 | 10/1965 | Maychark | 285/364 |
| 3,661,409 | 5/1972 | Brown et al. | 285/367 X |
| 4,036,258 | 7/1977 | Wolters | 285/364 X |

FOREIGN PATENT DOCUMENTS

1472750  5/1977  United Kingdom ............... 285/367

*Primary Examiner*—Thomas F. Callaghan
*Attorney, Agent, or Firm*—L. B. Guernsey; W. W. Ritt, Jr.

[57] ABSTRACT

A pipe coupling device, especially suitable for use in cryogenic systems, including a plurality of arcuate collar segments each having a radially extending inner groove with cam surfaces to grasp flanges at the ends of a pair of pipes to be coupled together in a fluid-tight arrangement. The ends of the collar segments are pivotally interconnected to a generally circular configuration having a pair of adjacent unconnected end portions. Means are provided for clamping the end portions of the collar together and for pressing the collar segments against the pipe flanges. A hydraulic jack is provided for forcing the end portions of the collar segments apart and for pivotally moving the collar segments radially outward from the pipe flanges when the pipes are to be disconnected. Flexible protectors about the pivot connections facilitate the breaking of ice which may form around the coupling device.

10 Claims, 8 Drawing Figures

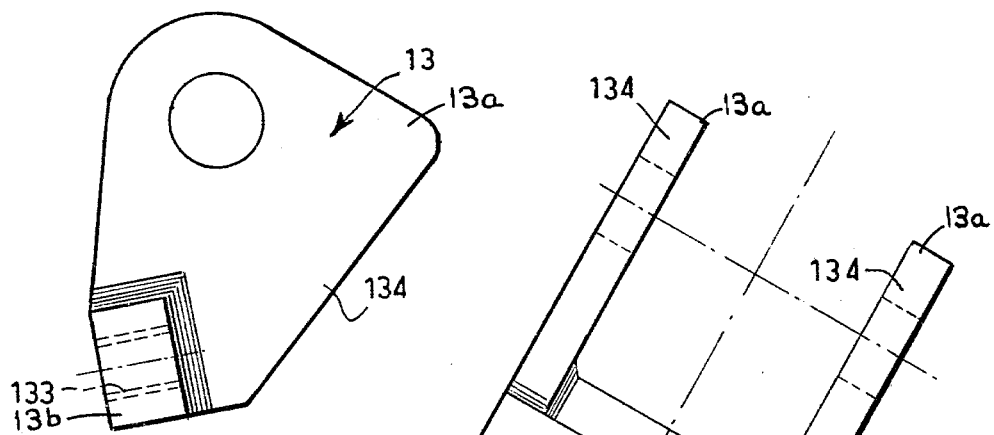
FIG. 3
FIG. 4
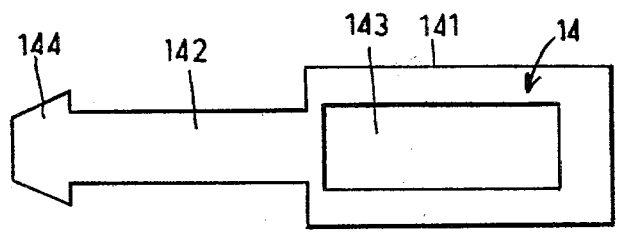
FIG. 5
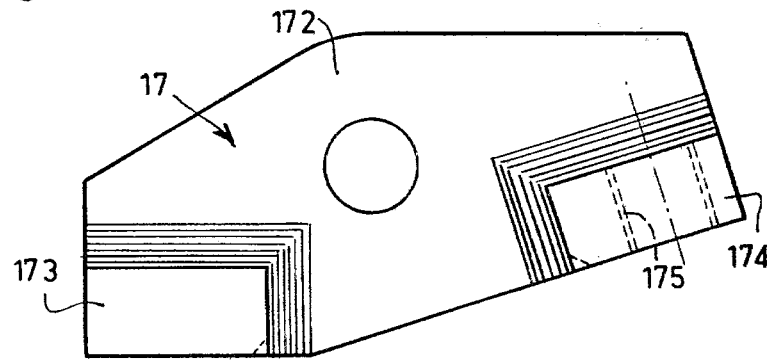
FIG. 6

RAPID DISCONNECT PIPE COUPLING DEVICE FOR CRYOGENIC SERVICE

BACKGROUND OF THE INVENTION

1. Field of the Invention

This invention relates to pipe coupling devices, and more particularly to rapid disconnect pipe coupling devices for use in cryogenic service.

2. Description of the Prior Art

Coupling devices suitable for clamping pipe or hose flanges together are commonly used in making fluid-tight connections in a quick, secure and safe manner between marine tanker manifolds and articulated loading arms mounted on docks or other storage facilities. These prior art coupling devices are generally designed to work with pipes or hoses having a radially extending flange at their outer end, and a cylindrical tanker manifold having a matching radially extending flange at its outer end. The devices secure the two flanges together in a fluid-tight manner by means of clamp assemblies which vary in design from relatively simple couplers with C-type clamps to hydraulically powered couplers utilizing toggle actuated clamps. Some examples of these coupler devices are described in U.S. Pat. Nos. 3,473,830 to Haley; 3,489,434 to Haley; 3,586,350 to Ashton; 3,661,408 to Gibbons; and 3,830,533 to Mezei et al. These devices work quite well when connected between a dock and a tanker transferring liquid fluid at normal temperatures, but are less satisfactory when transferring liquified gas, especially in locations where there may be sudden storms which require that the operation be discontinued and the coupling devices disconnected on short notice.

Liquified gas undergoes expansion during the transfer operation and thus creates an extremely low temperature which may cause the formation of ice on the coupling devices. When this happens it may be difficult or impossible to quickly release a prior art coupling device and to disconnect the articulated loading arm from the tanker manifold, thus resulting in damage to the gas transferring equipment. What is needed is a remotely controllable coupling device that can clamp the loading arm to the tanker manifold in a fluid-tight manner, and then quickly disconnect the arm from the manifold even in the presence of severe ice formation.

SUMMARY OF THE INVENTION

The present invention comprises a remotely controllable, fluid power operated pipe coupling apparatus having an articulated collar of arcuate segments for releasably securing a pair of abutting pipe flanges together. Each of the collar segments has internal frusto-conical cam surfaces that cooperate with complementary flange surfaces to press the pipe flanges together into a fluid-tight relationship when the coupling apparatus is closed. The collar segments are pivotally interconnected into a generally circular configuration having a pair of adjacent unconnected end portions. Means are provided for clamping the end portions of the collar segments together and for pressing the internal cam surfaces of the collar segments against the pipe flanges. A hydraulic jack is provided for forcing the end portions of the collar segments apart, and for pivotally moving the collar segments radially outward from the pipe flanges when the pipes are to be disconnected.

BRIEF DESCRIPTION OF THE DRAWINGS

FIG. 3 is an enlarged side elevation of an element of the apparatus shown in FIG. 2.

FIG. 4 is a plan view of the element shown in FIG. 3.

FIG. 5 is an enlarged view of a protector used in the apparatus of FIG. 2.

FIG. 6 is an enlarged elevation of an element of the apparatus shown in FIG. 2.

DESCRIPTION OF THE PREFERRED EMBODIMENT

Figure 1:
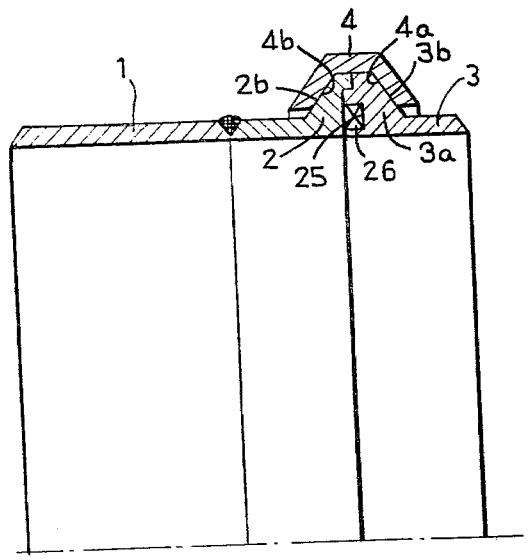
FIG. 1 is a longitudinal sectional view of a pair of pipe flanges coupled together by an articulated collar of the present invention.

An application of the present invention is illustrated in FIG. 1 wherein the end of a tanker manifold pipe 1, having a radial outward flange 2, is connected to the outboard end of a marine loading arm 3 having a radial outward flange 3a at the end. The flanges 2 and 3a are clamped together in a fluid-tight arrangement by a collar segment 4 having a pair of internal frusto-conical cam surfaces 4a, 4b which press against the complementary cam surfaces 2b, 3b respectively of the frusto-conical flanges 2, 3a. The left end portion of the flange 3a includes an annular groove 25 which carries an annular sealing member 26 that presses against the right end portion of the flange 2 to effect a fluid-tight seal between the flanges 2 and 3a.

Figure 2:
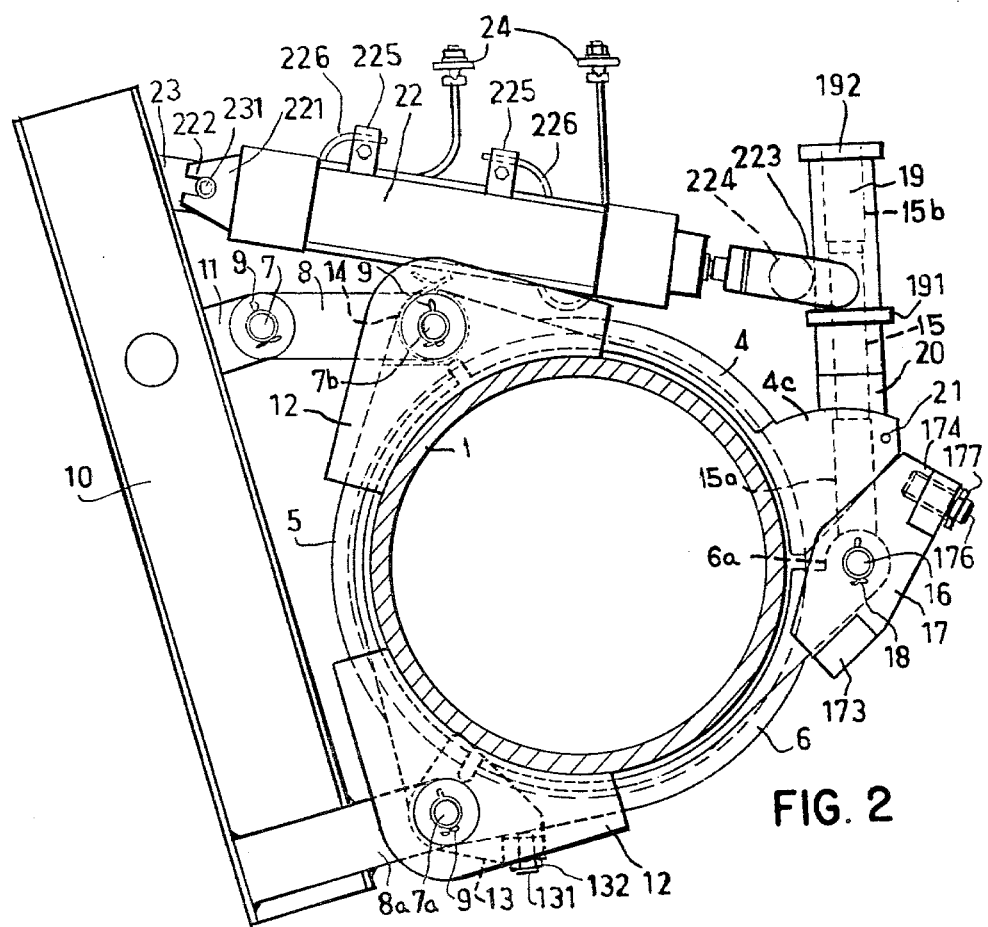
FIG. 2 is an end view of a coupling device according to the present invention, showing the articulated collar in closed position.

The coupling device, as disclosed more fully in FIG. 2, includes an articulated collar having a plurality of collar segments 4, 5 and 6. One end of each of the collar segments is yoke-shaped and the other end is shaped for insertion within a yoke for connection to another collar segment by a pivot axle 7a, 7b, to thereby interconnect two collar segments in an end-to-end relationship. In this manner the adjacent ends of collar segments 4 and 5 (FIG. 2) are connected by the axle 7b, and the adjacent ends of collar segments 5 and 6 are connected by another axle 7a. Each of the pivoting axles 7a, 7b also extends through the adjacent end of one of a pair of support arms 8, 8a. The other end of the arm 8a is welded or otherwise fixed to a beam 10, and the other end of the arm 8 is pivotally connected by an axle 7 to a crosspiece 11 that is welded or otherwise secured to the beam 10. Anti-friction rings or washers, of Teflon or other material having a low coefficient of friction, can be included on the axles 7, 7a and 7b between the elements through which these axles extend, to assure free movement at those locations. A cotter pin or other retaining means 9 near the end of each of the axles 7, 7a and 7b, functions to retain the axles in position.

Insulating plates 12 (FIG. 2) of plastic or other suitable material, are mounted on axles 7a, 7b close to the collar segments 4, 5 and 6. These plates 12 overlap a considerable portion of these segments to create discontinuities in the ice formed in this area, thereby helping to break the ice when the segments are pivoted about the axles 7a, 7b as the coupling apparatus is opened.

Pivotally mounted on the axle 7a is a cam unit 13 that straddles the segment 6. The cam 13 has a pair of lobes 13a that extend from a web 13b toward the pipes 1, 3 close to the flanges 2, 3a, and a cam adjusting screw 131 which is threaded into a hole 133 (FIGS. 3, 4) in the cam web 13b and locked in position by a nut 132 (FIG. 2). The inner end of the screw 131 (FIG. 2) is adjacent the collar segment 6, so that as the collar segment 6 pivots clockwise about the axle 7a, i.e., outwardly or away from the pipe 1, the left portion of the segment presses against the screw and forces the cam 13 to pivot clockwise on the axle 7a. This movement of the cam 13 forces the lobes 13a against the pipes 1, 3, causing the axle 7a to move away from the pipes and thus the collar segment 5 to pivot clockwise about the axle 7b, i.e., radially outward from the pipe 1, thereby breaking the ice to facilitate disconnection of the arm from the tanker manifold. If desired, a cam unit 13 also can be included on the axle 7b for the same function.

A protector 14 (FIG. 5) also formed from a sheet of plastic or other material having the desired flexibility at low temperatures, can be employed on the axles 7, 7a and 7b to create discontinuities in the ice that may form in these areas, and thereby assist in breaking the ice upon opening movement of the coupler. One such protector 14 is shown around the axle 7b at the upper end of the collar segment 5 (FIG. 2). The protector 14 (FIG. 5) includes a wide portion 141 to cover the yoke portion of one of the adjacent collar segments, and a narrow portion 142 to cover the end of the other adjacent collar segment which is connected to this yoke portion. The protector 14 (FIG. 5) also includes a locking portion 144 to be inserted into an opening 143 in the wide portion to secure the protector about the axle and yoke.

The collar segments 4, 5 and 6 are held in the closed position (FIG. 2) against the flanges 2, 3a (FIG. 1) by closure and separating means which includes a shaft 15 pivotally connected at its lower end by an axle 16 to a yoke-shaped end 6a of the collar segment 6 (FIG. 2). The lower portion 15a of the shaft 15 extends upwardly between the opposed arms of a yoke 4c that is integral with the segment 4, and this lower portion 15a is square in cross-section. The clearance between the yokes 4c, 6a and the adjacent flat sides of the shaft portion 15a are relatively small so that the yokes ensure good guidance of the shaft as it is pivoted away from the pipe 1 during opening of the coupling. The upper portion 15b of the shaft 15 is threaded to receive a nut 19 having lower and upper radial flange-like bases 191, 192, and this nut 19 bears against a hollow cylindrical spacer 20 surrounding the central portion of the shaft 15. The lower end of the spacer 20 presses against the curved upper surfaces of the yoke 4c to releasably secure the collar segment 4 to the collar segment 6, and thus to securely yet releasably clamp the collar segments 4, 5 and 6 around the flanges 2 and 3a of the pipes 1 and 3. A shear pin 21 (FIG. 2) extends through the yoke 4c to prevent unintentional pivoting of the shaft 15 clockwise about the axle 16. As the coupling device is actuated to disconnect the loading arm from the tanker, the pin 21 is sheared by the lower portion 15a of the shaft 15 as it is pivoted clockwise away from the yoke 4c.

Figure 7:
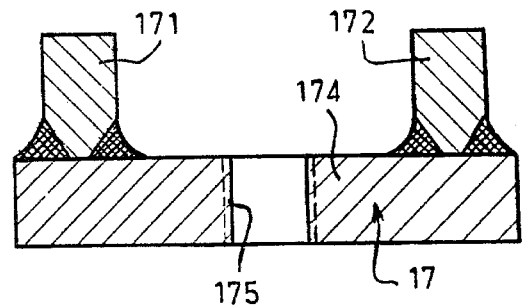
FIG. 7 is a sectional view of the element shown in FIG. 6.
Figure 8:
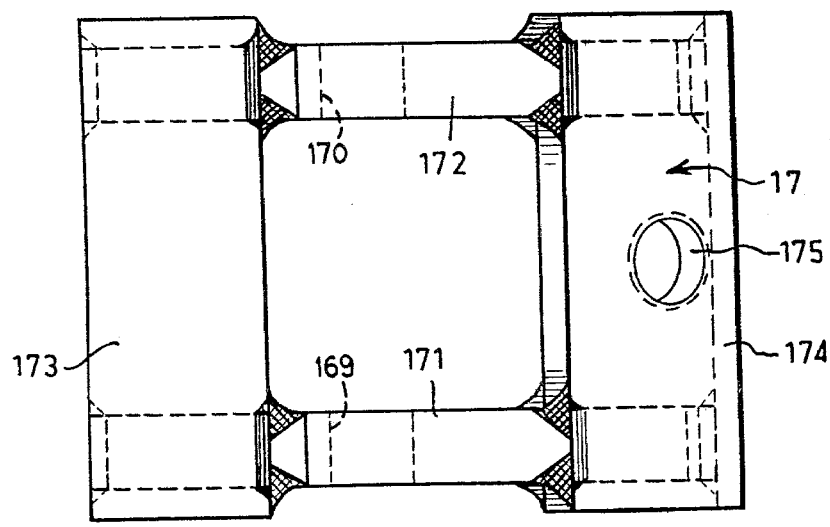
FIG. 8 is a bottom view of the element shown in FIG. 6.

Pivotally mounted on the axle 16 is a yoke-shaped stop unit 17 that straddles the upper end of the segment 6. The stop 17 has a pair of lobes 171–172 (FIGS. 6–8) that extend from a pair of webs 173, 174 toward the pipes 1, 3, close to the flanges 2, 3a and a cam adjusting screw 176 which is threaded into a hole 175 (FIGS. 7, 8) in the stop web 174 and locked in position by a nut 177. The inner end of the screw 176 (FIG. 2) is adjacent the shaft 15, so that as the shaft 15 pivots clockwise about the axle 16, i.e., outwardly or away from the pipe 1, the lower portion of the shaft presses against the screw and forces the stop 17 to pivot clockwise on the axle 16. This movement of the stop 17 forces the web 173 against the upper end of the segment 6, causing the axle 16 to move away from the pipes and thus the collar segment 6 to pivot clockwise about the axle 7a, radially outward from the pipe 1, thereby breaking the ice to facilitate disconnection of the arm from the tanker manifold. A cotter pin or other retaining means 18 near the end of the axle 16 functions to retain the axle in position through a pair of holes 169, 170 in the lobes 171, 172.

Power to move the collar segments 4, 5 and 6 into a disconnected position is provided by a hydraulic jack 22 (FIG. 2) having one end connected to the beam 10 by an axle 231, a tab 221 and a support arm 23. One end of the support arm 23 is welded or otherwise connected to the upper portion of the beam 10 and the other end of the arm 23 has the axle 231 extending laterally therethrough for connection to a cutout 222 in the left end of a support tab 221. The support tab 221 is welded or otherwise connected to the left end of the jack 22. The outer end of the piston of the jack includes a yoke 223 whose lateral parts grip the nut 19 on the shaft 15, with the outer end of the yoke 223 being supported by the flange-like base 191 of the nut 19. A peg 224 extending between two lateral parts (only one of which is shown in FIG. 2) of the yoke 223 bears against the nut 19.

A pair of support cables 226 each having one end connected to a pair of anchoring tabs 24 which may be connected to a support such as a loading arm (not shown) support the jack when the coupler is disconnected from the pipes 1, 3. The other end of the cables 226 being connected to the jack by a pair of tabs 225 which are welded or otherwise connected to the body of the jack.

When it is desired to separate the loading arm from the ship's manifold, the jack 22 (FIG. 2) is actuated causing the peg 224 of the yoke 223 to press against the nut 19 moving the nut and the shaft 15 in a clockwise direction around the pivot axle 16. The clockwise movement of the shaft 15 shears the pin 21 and presses the lower portion of the shaft 15 against the adjusting screw 176 in the stop 17. The clockwise movement of the shaft 15 causes the stop 17 and the collar segment 6 to move clockwise around the axle 7a thereby moving the collar segment 6 radially away from the pipe 1 while breaking the ice around the lower portion of the pipe and the collar segment.

Additional outward movement of the piston in the jack 22 forces the left end portion of the collar segment 6 against the screw 132 in the cam 13 causing the cam 13, the collar segment 5 and the beam 10 to move clockwise around the axle 7b thereby forcing the collar segment 5 radially away from the pipe 1 while breaking the ice in this area and releasing the coupler from the pipes 1, 3. The collar segments 4, 5 and 6, the beam 10, the shaft 15, the attached axles, cams and stops, which remain attached to each other, fall down on to the ship (not shown). The jack 22 easily separates from the falling collar with the nut 19 moving away from the yoke 223 and the axle 231 in the support arm 23 moving out of the cutout 222 in the tab 221. The jack 22 remains suspended by the cables 226 attached to a loading arm (not shown).

The articulated collar of the present invention provides means for securing the pipes in a fluid-tight connection which can be quickly disconnected by activating the hydraulic jack. The flexible protectors and the insulating plates which cover the pivot axles at the ends of the collar segments aid in breaking any ice which may form on the coupling device and facilitate the quick removal of the coupling device from the pipes.

Although the best mode contemplated for carrying out the present invention has been herein shown and described, it will be apparent that modification and variation may be made without departing from what is regarded to be the subject matter of the invention.

What is claimed is:

1. A coupling device for releasably connecting two pipes together while operating at cryogenic temperatures, each pipe having a flange thereon, said device comprising:
    an articulated collar having a plurality of arcuate collar segments, each of said segments having means for securing the flanges of said pipes together when said collar segments are pressed in a radially inward direction;
    pivot means for interconnecting said collar segments into a generally circular configuration having a pair of adjacent unconnected end portions;
    means for clamping said end portions of said collar segments together and for pressing said collar segments against said pipe flanges to secure said pipes in a fluid-tight connection;
    a plurality of flexible protective members;
    means for securing each one of said protective members about a corresponding one of each of said pivot means, said protective members being movable to aid in breaking any ice which may form about said collar segments; and
    power means for forcing said end portions apart and for pivotally moving said collar segments radially outward from said pipe flanges.

2. A pipe coupling device as defined in claim 1 wherein said power means includes a hydraulic jack connected between one end of said articulated collar and at least one of said pivot means in said collar.

3. A pipe coupling device as defined in claim 1 including at least one insulating plate and means for mounting said insulating plate about one of said pivot means.

4. A coupling device for releasably connecting the ends of two pipes together while operating at cryogenic temperatures, each of said pipes having a flange adjacent the end thereof, said device comprising:
    an articulated collar having a plurality of arcuate collar segments, each of said segments having means for grasping said pipe flanges to hold the ends of said pipes together when said collar segments are pressed in a radially inward direction;
    pivot means for interconnecting said collar segments into a generally circular configuration having a pair of adjacent disconnected end portions;
    a protective member around said pivot means, said protective member having means for creating discontinuities in ice which may form about said pivot means, said protective member being movable and having means for breaking ice on said collar segments when said collar segments are pressed radially away from said pipe flanges;
    a frame member;
    means for connecting said frame member to at least a portion of said pivot means;
    means for clamping said end portions of said collar together and for pressing said collar segments in a radially inward direction about said pipe flanges;
    a hydraulic jack; and
    means for connecting said hydraulic jack between said frame member and one of said end portions of said collar.

5. A pipe coupling device as defined in claim 4 including means for pivotally moving one end portion of said collar radially outward from said pipe flanges when said hydraulic jack is actuated.

6. A pipe coupling device as defined in claim 4 including means for disconnecting said clamping means from one of said end portions of said collar when said hydraulic jack is actuated.

7. A pipe coupling device as defined in claim 4 including means for releasably connecting said hydraulic jack to said frame member and to said collar, and means for disconnecting said hydraulic jack from said frame member and from said collar when said collar moves radially outward from said pipe flanges.

8. A pipe coupling device as defined in claim 7 including means for supporting said hydraulic jack when said jack is disconnected from said frame member and from said collar.

9. A coupling device for releasably connecting two pipes together while operating at cryogenic temperatures, each pipe having a flange thereon, said device comprising:
    an articulated collar having a plurality of arcuate collar segments, each of said segments having means for securing the flanges of said pipes together when said collar segments are pressed in a radially inward direction;
    pivot means for interconnecting said collar segments into a generally circular configuration having a pair of adjacent unconnected end portions;
    means for clamping said end portions of said collar segments together and for pressing said collar segments against said pipe flanges to secure said pipes in a fluid-tight connection;
    means for creating discontinuities in ice formed adjacent said pivot means;
    power means for forcing said end portions apart and for pivotally moving said collar segments radially outward from said pipe flanges; and
    means for pivotally moving said creating means about said pivot means when said collar segments move radially outward, to thereby break ice which may have formed about said collar segments.

10. A coupling device for releasably connecting two pipes together while operating at cryogenic temperatures, each pipe having a flange thereon, said device comprising:
    an articulated collar having a plurality of arcuate collar segments, each of said segments having means for securing the flanges of said pipes together when said collar segments are pressed in a radially inward direction;
    pivot means for interconnecting said collar segments into a generally circular configuration having a pair of adjacent unconnected end portions;
    means for clamping said end portions of said collar segments together and for pressing said collar segments against said pipe flanges to secure said pipes in a fluid-tight connection;
    a plurality of insulating plates;

means for securing each one of said insulating plates about a corresponding one of said pivot means;
power means for forcing said end portions apart and for pivotally moving said collar segments radially outward from said pipe flanges; and
means for pivotally moving said insulating plates about said pivot means when said collar segments are moved radially outward, to thereby break ice which may have formed about said collar segments.

* * * * *